(12) United States Patent
Skafidas

(10) Patent No.: US 7,388,930 B1
(45) Date of Patent: Jun. 17, 2008

(54) METHOD AND APPARATUS FOR REMOVING CROSSTALK AND OTHER INTERFERENCE IN COMMUNICATIONS SYSTEMS

(75) Inventor: Efstratios Skafidas, Coburg (AU)

(73) Assignee: Bandspeed, Inc., Austin, TX (US)

( * ) Notice: Subject to any disclaimer, the term of this patent is extended or adjusted under 35 U.S.C. 154(b) by 1158 days.

(21) Appl. No.: 09/970,520

(22) Filed: Oct. 3, 2001

Related U.S. Application Data

(60) Provisional application No. 60/311,487, filed on Aug. 10, 2001.

(51) Int. Cl.
  *H03K 9/00* (2006.01)
(52) U.S. Cl. .................. 375/316; 375/346; 375/350; 375/147; 375/148; 375/371; 375/345; 375/150; 455/562.1; 455/561; 455/82
(58) Field of Classification Search ................ 375/316, 375/147, 267, 346, 149, 350, 345, 229, 150, 375/371, 148; 455/562, 562.1, 561, 82
  See application file for complete search history.

(56) References Cited

U.S. PATENT DOCUMENTS

| | | | |
|---|---|---|---|
| 4,179,696 A | 12/1979 | Quesinberry et al. | |
| 5,068,873 A | 11/1991 | Murakami | 375/13 |
| 5,111,481 A | 5/1992 | Chen et al. | 375/14 |
| 5,432,816 A | 7/1995 | Gozzo | 375/232 |
| 5,432,821 A | 7/1995 | Polydoros et al. | 375/340 |
| 5,715,280 A | 2/1998 | Sandberg et al. | 375/260 |
| 5,926,455 A | 7/1999 | Allpress | |
| 6,295,326 B1 | 9/2001 | Tonissen et al. | 375/350 |
| 6,452,987 B1* | 9/2002 | Larsson et al. | 375/345 |
| 6,553,085 B1* | 4/2003 | Trans | 375/346 |
| 6,631,175 B2* | 10/2003 | Harikumar et al. | 375/350 |
| 6,771,690 B2* | 8/2004 | Heikkila | 375/147 |
| 2002/0001355 A1 | 1/2002 | Tore | |
| 2002/0013164 A1* | 1/2002 | Leifer et al. | 455/562 |
| 2003/0072382 A1* | 4/2003 | Raleigh et al. | 375/267 |

FOREIGN PATENT DOCUMENTS

EP  0 795 985 A2  9/1997

(Continued)

OTHER PUBLICATIONS

Bellanger, M. G., "Adaptive Digital Filters and Signal Analysis", 1987, XP002169514, pp. 4-12 and 179-183.

(Continued)

*Primary Examiner*—Chieh M. Fan
*Assistant Examiner*—Eva Puente
(74) *Attorney, Agent, or Firm*—Hickman Palermo Truong & Becker LLP; Edward A. Becker

(57) ABSTRACT

An approach for estimating and removing crosstalk and other interference in a communications receiver is disclosed. The approach enables crosstalk and interference of arbitrary origin and power spectral density to be removed from a received signal, thereby improving the signal to noise ratio (SNR). A receiver samples the received signal at a rate N times the required sampling rate, and splits the signal into N separate observation sequences, all at the required sampling rate. The N observation sequences are separated into a data signal and a crosstalk signal. The crosstalk signal is discarded, while the data signal is passed to equalization and demodulation circuits of the receiver.

26 Claims, 4 Drawing Sheets

FOREIGN PATENT DOCUMENTS

| | | |
|---|---|---|
| EP | 0 912 023 A1 | 4/1999 |
| WO | WO 97/40587 | 10/1997 |
| WO | WO 98/59450 | 12/1998 |
| WO | WO 00/54472 | 9/2000 |

OTHER PUBLICATIONS

Dalle Mese, et al., "Fixed-Lag Smoother for Digital Channel Equalisation", Electronic Letters, IEE Stevenage, vol. 13, No. 12, Jun. 9, 1977, p. 366-367, XP0000761143, ISSN: 0013-5194.

Chen, W. Y., "DSL: Simulation Techniques and Standards Development for Digital Subscriber Line Systems", 1988, XP002169513, pp. 8, 9, 11, 149-159.

Van Bladel, Mark and Moeneclaey, Marc, "Time-domain Equalization for Multicarrier Communication," IEEE Global Telecommunications Conference, Nov. 14, 1995, pp. 167-171.

Lashkarian, Navid and Kiaei, Sayfe, "Fast Algorithm for Finite-Length MMSE Equalizers with Application to Discrete Multitone Systems," IEEE International Conference on Acoustics, Speech, and Signal Processing, Mar. 15, 1999, pp. 2753-2756.

Melsa, P., et al., "Impulse Response Shortening for Discrete Multitone Transceivers", IEEE Transactions on Communications, vol. 44, No. 12, Dec. 1996.

Al-Dhahir, N., et al., "Optimum Finite-Length Equalization for Multicarrier Transceivers", IEEE Transactions on Communications, vol. 44, No. 1, Jan. 1996.

Chow, J., et al., "A Discrete Multitone Transceiver System for HDSL Applications", IEEE Journal on Selected Areas in Communications, vol. 9, No. 6, Aug. 1991.

\* cited by examiner

METHOD AND APPARATUS FOR REMOVING CROSSTALK AND OTHER INTERFERENCE IN COMMUNICATIONS SYSTEMS

RELATED APPLICATIONS

This application claims priority from U.S. Provisional Patent Application No. 60/311,487, entitled "METHOD AND APPARATUS FOR CROSSTALK AND INTERFERENCE REMOVAL IN A COMMUNICATIONS SYSTEM," filed Aug. 10, 2001 by Efstratios Skafidas, the contents of which are incorporated herein by reference in their entirety for all purposes. This application is related to co-pending U.S. patent application Ser. No. 09/754,008 entitled "Approach for Processing Data Received From a Communications Channel" by Efstratios Skafidas and Shane Michael Tonissen.

FIELD OF THE INVENTION

The present invention relates generally to communications systems, and more particularly, to an approach for processing data received from a communications channel to reduce cross talk and other interference.

BACKGROUND OF THE INVENTION

Communications systems are characteristically susceptible to cross talk and other types of interference. The sources of such interference vary widely depending upon the environment in which particular communications systems are implemented and include, for example, other transceivers and communications systems. Interference can causes a decrease in the overall quality of a communications system, as indicated by the Signal-to-Noise Ratio (SNR) of a communications system. Consequently, improving the SNR will result in a corresponding improvement in the quality of the received signal. Fundamental theories, such as the Shannon Capacity Theorem, suggest that the capacity (amount of data which can be transferred error free) of a communications system is a function of the SNR.

Communications receivers typically process a received signal by sampling the received signal at a specified minimum sampling rate known as the Nyquist rate. The ability to monitor the interference affecting a communications system is limited by the sampling rate, which in conventional communications systems is the minimum sampling rate. Consequently, the degree to which the interference may be mitigated or compensated for is limited by the sampling rate of the receiver. By increasing the sampling rate, the effects of interference may be more optimally monitored and mitigated, thereby improving the SNR.

Based upon the foregoing, there is a need for an approach for processing data received from a communications channel to compensate for cross talk and other interference that does not suffer from the limitations of prior approaches.

SUMMARY OF THE INVENTION

According to one aspect of the invention, a method is provided for processing data received from a communications channel. The method includes sampling the received data at a specified sampling rate to generate sampled data and separating the sampled data into two or more subchannels of information. The method also includes filtering the two or more subchannels of information to remove crosstalk and other interference; and combining the two or more subchannels of information to generate combined data.

According to another aspect of the invention, an apparatus is provided for processing data received from a communications channel. The apparatus includes a sampling mechanism configured to sample the received data at a specified sampling rate to generate sampled data and a separator configured to separate the sampled data into two or more subchannels of information. The apparatus also includes one or more filters configured to filter the two or more subchannels of information to remove crosstalk and other interference; and a combiner configured to combining the two or more subchannels of information to generate combined data.

Embodiments of the invention have application in any type of communications receiver, for example, those in which DMT and OFDM modulation is used, and is particularly suitable for application in high speed digital transmission systems that utilize standard twisted pair telephone lines, such as ADSL, G.Lite and VDSL, and also in wireless systems such as the IEEE 802.11a system.

According to another aspect of the invention, techniques are provided for using the additional information obtained from the increased sampling rate of the received signal to mitigate the effect of interference on the communications system. According to one aspect of the invention, a method is used to over sample the received signal by a factor N times the baud rate. The over sampled signal is then separated into N discrete paths. These paths are constructed by obtaining defined sequences of samples. This step is performed in order to introduce system diversity. According to other aspects, the sampling rate utilized may be either constant or variable.

BRIEF DESCRIPTION OF DRAWINGS

The present invention is depicted by way of example, and not by way of limitation, in the figures of the accompanying drawings and in which like reference numerals refer to similar elements in which.

DETAILED DESCRIPTION OF THE INVENTION

In the following description, for the purposes of explanation, numerous specific details are set forth in order to provide a thorough understanding of the present invention.

It will be apparent, however, that the present invention may be practiced without these specific details. In other instances, well-known structures and devices are depicted in block diagram form in order to avoid unnecessarily obscuring the present invention.

A novel approach is provided for processing data received from a communications channel to remove noise, such as crosstalk and other interference. Various aspects of the invention are described in the following sections:

I. OVERVIEW
II. OVERSAMPLING THE RECEIVED SIGNAL
III. SEPARATING THE OVERSAMPLED SIGNAL INTO SUBCHANNELS
IV. SHORTENING THE IMPULSE RESPONSE LENGTH (IRL) OF THE SUBCHANNELS
V. DETERMINING AND APPLYING FIR FILTERS TO THE SUBCHANNELS
VI. COMBINING THE FILTERED SUBCHANNELS
VII. EQUALIZING THE COMBINED SIGNAL TO FURTHER SHORTEN THE IMPULSE RESPONSE OF THE COMMUNICATIONS CHANNEL
VIII. IMPLEMENTATION MECHANISMS

I. Overview

Figure 1:
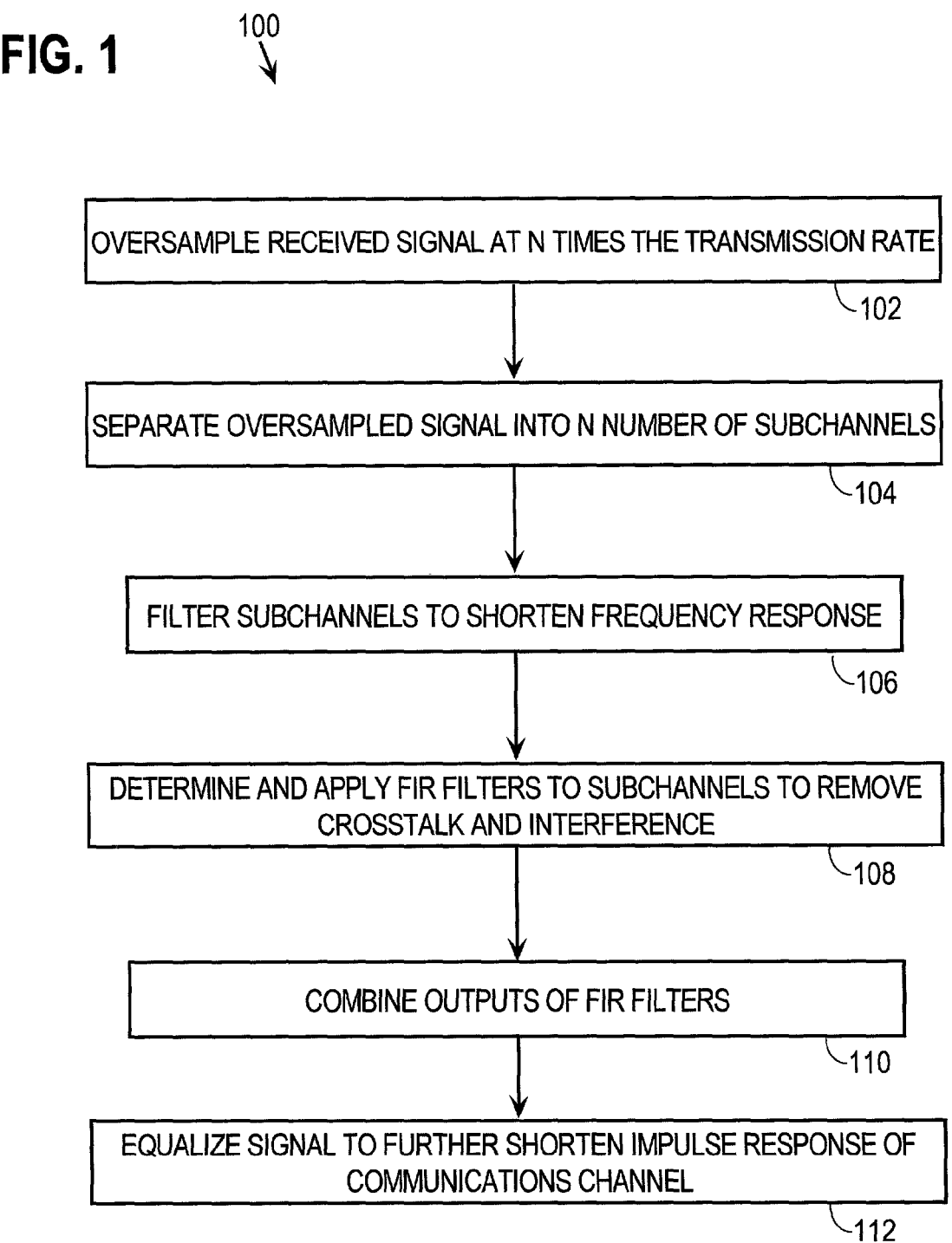
FIG. 1 is a flow diagram that depicts an approach for removing crosstalk and other interference from data received from a communications channel, according to one embodiment of the invention.

FIG. 1 is a flow diagram 100 that depicts an approach for processing data received from a communications channel to remove noise, such as crosstalk and other interference, according to an embodiment of the invention. In step 102, a signal received from a communications channel is oversampled at N times the transmission rate to generate an oversampled signal. As is described in more detail hereinafter, this step may be performed, for example, by an analog-to-digital converter.

In step 104, the oversampled signal is separated into N number of subchannels of information. In step 106, the subchannels are filtered to shorten the overall frequency response of the system.

In step 108, a set of finite impulse response (FIR) filters is determined and applied to the subchannels to remove crosstalk and other interference. In step 110, the outputs of the FIR filters are combined to generate a combined signal. In step 112, the combined signal is equalized to further shorten the impulse response of the communications channel. As is described in more detail hereinafter, not all of the steps depicted in FIG. 1 are required by the invention. For example, step 112 is optional, and may or may not be performed depending upon the requirements of a particular application.

Figure 2:
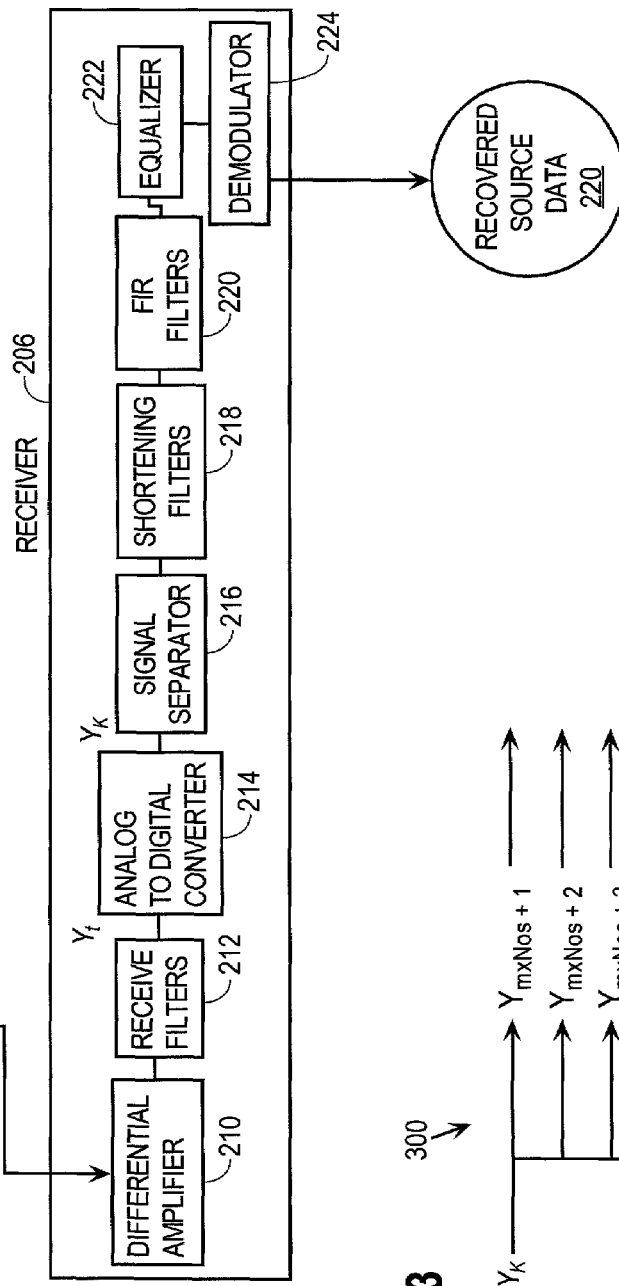
FIG. 2 is a block diagram that depicts an arrangement for removing crosstalk and other interference from data received from a communications channel according to an embodiment of the invention.

Various aspects of the invention are now described with reference to FIG. 2, which is a block diagram 200 that depicts an arrangement for processing data received from a communications channel according to an embodiment of the invention. An information signal $S_k$ is transmitted through a communications channel or physical medium 202 that has transfer function H(t). Diagram 200 also depicts the addition of noise interference and crosstalk signals as $\zeta_j$ that pass through a communications channel 204 having a transfer function θ(t), which may be different than transfer function H(t). The outputs of communications channels 202, 204 are added and presented to the input of a receiver 206. A third component v(t) (not illustrated) is added to denote additive uncorrelated white noise. Examples of such noise are thermal or Johnson noise in receiver 206.

The signal received at the input of receiver 206 is processed by a differential amplifier 210 and receive filters 212. The filtered signal, denoted $Y_f$, is processed by an analog-to-digital converter 214 to produce a sampled signal $Y_k$. A signal separator 216 separates the sampled signal $Y_k$ into N number of subchannels. The subchannels are processed by an IRL filter 218 to shorten the frequency response. The subchannels are then processed by an FIR filter 220 and combined. An equalizer 216 and a demodulator 218 may then be used to process the re-combined sampled signal $Y_k$ to provide a recovered source data 220.

II. Oversampling the Received Signal

After being processed by receive filters 212, filtered signal $Y_f$, is continuous in nature and may be expressed mathematically as:

$$Y_t = H(t) * \left( \sum_{k=0}^{\infty} g(t - kT_1) S_k \right) + \theta(t) * \left( \sum_{j=0}^{\infty} g(t - jT_2) \zeta_j \right) + v(t)$$

where H(t) and θ(t) are the transfer functions of communications channels 202, 204, respectively, and v(t) is uncorrelated noise. The quantity $$g(t - kT) = \begin{cases} 1 & kT \leq t < (k+1)T \\ 0 & \text{otherwise} \end{cases}$$

is used to denote the application of duration T of an input to communications channels 202, 204. Note that the transmission rates of the communications system and the interference source $T_1$ and $T_2$ may be arbitrary and unrelated to each other.

The quantities $S_k$ and $\zeta_j$ are zero mean random variables that satisfy the following relationships:

$E(S_k)=0$ $E(\zeta_j)=0$ $E(S_k \zeta_j)=0 \forall k,j$.

According to an embodiment of the invention, the continuous signal $Y_t$ is sampled by analog to digital converter 214 to produce a discrete data sequence of samples $Y_k$. The discrete time oversampled transfer functions of communications channels 202, 204 are defined as follows:

$$H(k) = \sum_{k=0}^{L_1} h_k z^{-k} \text{ and}$$

$$\Theta(k) = \sum_{k=0}^{L_2} \theta_k z^{-k}$$

where $z^{-k}$ denotes a k step delay operator and $L_1$ and $L_2$ are the impulse response lengths of communications channels 202, 204, respectively.

III. Separating the Oversampled Signal into Subchannels

Figure 3:
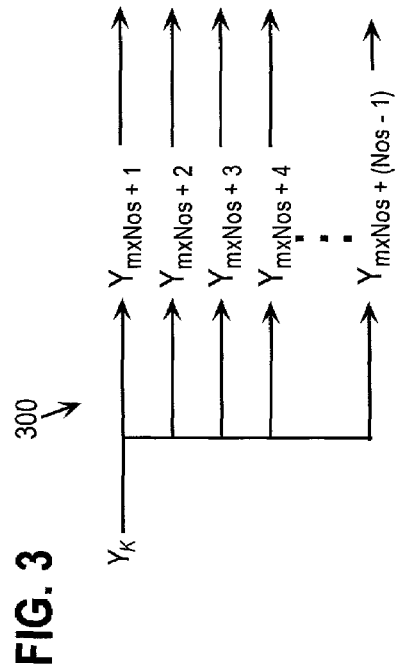
FIG. 3 is a block diagram that depicts an oversampled signal $Y_k$ being separated into $N_{OS}$ discrete subchannels of information according to an embodiment of the invention.

As described herein, signal separator 216 separates the discrete data sequence of samples $Y_k$ into subchannels. FIG. 3 is a block diagram 300 that depicts the discrete data sequence of samples $Y_k$ separated into $N_{OS}$ discrete subchannels. Diagram 300 depicts that all samples whose sampling time instant m×N+j where m is any positive integer, N is the sampling rate and j:0<j<N, are said to have originated from subchannel j. For purposes of explanation herein, the output from each subchannel is considered to represent an independent observation. This process introduces diversity into the system. The value selected for N may be fixed, or may vary over time, depending upon the requirements of a particular application. For example, there may be situations where it is desirable to increase the amount of diversity in the system and the value for N may be increased accordingly.

Figure 4:
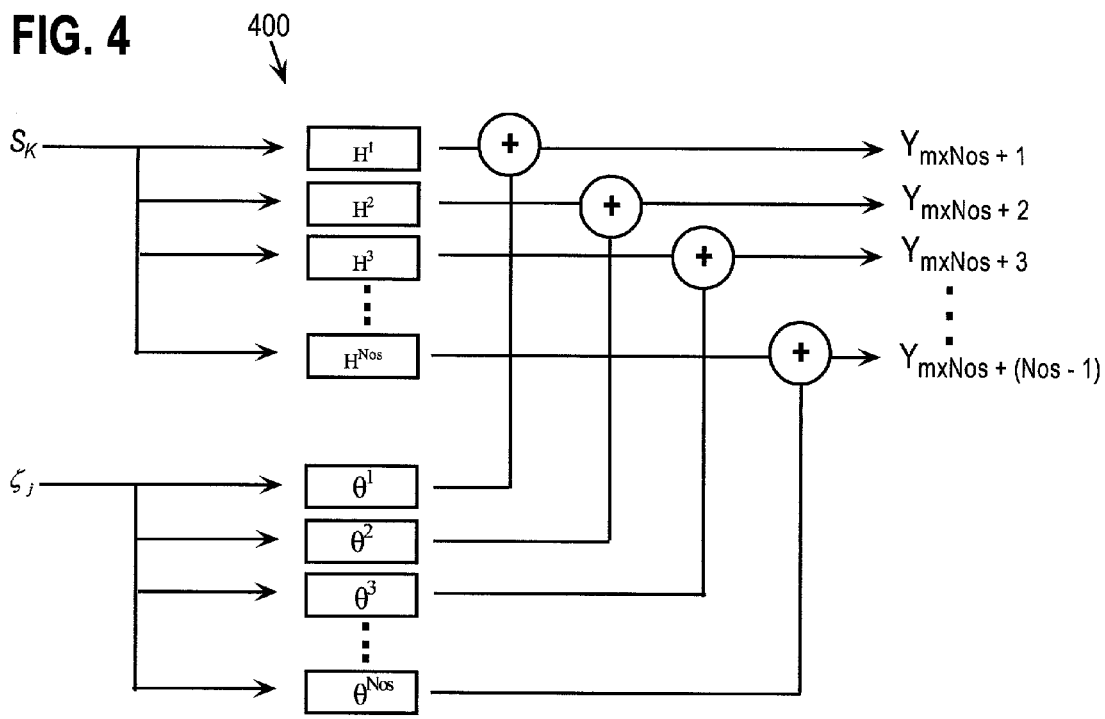
FIG. 4 is a block diagram that depicts the oversampled signal $Y_k$ and its constituent components of information signal $S_k$ and noise interference and crosstalk signals as $\xi_j$, according to an embodiment of the invention.

FIG. 4 is a block diagram 400 that depicts the oversampled signal $Y_k$ and its constituent components of information signal $S_k$ and crosstalk and interference signals as $\zeta_j$, and consequently, how diversity is introduced into the system. The new component of each of the transfer functions relates to the previous via the following relationships:

$$Y_k^1 = \sum_{i=0}^{[L_1/N]} h_i^1 S_{k-i} + \sum_{i=0}^{[L_2/N]} \theta_i^1 \zeta_{k-i} + v_k^1$$

$$Y_k^2 = \sum_{i=0}^{[L_1/N]} h_i^2 S_{k-i} + \sum_{i=0}^{[L_2/N]} \theta_i^2 \zeta_{k-i} + v_k^2$$

$$\vdots$$

$$Y_k^{N-1} = \sum_{i=0}^{[L_1/N]} h_i^{N-1} S_{k-i} + \sum_{i=0}^{[L_2/N]} \theta_i^{N-1} \zeta_{k-i} + v_k^{N-1}$$

where the new subchannel components are determined in accordance with the following:

$$h_i^1 = \sum_{j=0}^{N-1} h_{i*N+j} \forall i$$

$$h_i^2 = \sum_{j=0}^{N-2} h_j i = 0$$

$$h_i^2 = \sum_{j=0}^{N-1} h_{i*N+j-1} i \neq 0$$

$$h_i^{N-1} = h_0 i = 0$$

$$h_i^{N-1} = \sum_{j=0}^{N-1} h_{i*N+j-N+1} i \neq 0$$

Similarly the crosstalk and interference relationships are determined from the following relationships:

$$\theta_i^1 = \sum_{j=0}^{N-1} \theta_{i*N+j} \forall i$$

$$\theta_i^2 = \sum_{j=0}^{N-2} \theta_j i = 0$$

$$\theta_i^2 = \sum_{j=0}^{N-1} \theta_{i*N+j-1} i \neq 0$$

$$\theta_i^{N-1} = \theta_0 i = 0$$

$$\theta_i^{N-1} = \sum_{j=0}^{N-1} \theta_{i*N+j-N+1} i \neq 0$$

Since the sequence $v_k$ is defined to be an orthogonal increments process (See, e.g., *Time Series: Theory and Methods*, by Peter J. Brockwell and Richard A. Davis, $2^{nd}$ Edition, Springer, ISBN 0-387-97429-6 and *Brownian Motion and Stochastic Calculus*, by Ioannis Karatzas and Steven E. Shreve, Graduate Texts in Mathematics, Springer Verlag ISBN 0-387-97655-8) satisfying the following relationships:

$$E(v_k)=0$$

and $$E(v_k \cdot v_l)=\sigma^2 \delta_{k,l}$$

The $v_k$ can be separated into N distinct sources, denoted $v_k^i$, each satisfying the above properties, i.e.:

$$E(v_k^i)=0$$

$$E(v_k^i \cdot v_j^i)=\sigma^2 \delta_{k,l}$$

$$E(v_k^i \cdot v_l^m)=\sigma^2 \delta_{i,m,k,l}.$$

As an illustrative example, consider the following four times (N=4) oversampled system with $\Theta(k)=0$. The discrete data sequence of samples $Y_k$ is given by:

$$Y_1 = h_0 S_0 + h_1 S_0 + h_2 S_0 + h_3 S_0 + h_4 S_1 + h_5 S_1 + h_6 S_1 + h_7 S_1 + h_8 S_2 + h_9 S_2 + \ldots$$

$$Y_2 = h_0 S_0 + h_1 S_0 + h_2 S_0 + h_3 S_1 + h_4 S_1 + h_5 S_1 + h_6 S_1 + h_7 S_2 + h_8 S_2 + h_9 S_2 + \ldots$$

$$Y_3 = h_0 S_0 + h_1 S_0 + h_2 S_1 + h_3 S_1 + h_4 S_1 + h_5 S_1 + h_6 S_2 + h_7 S_2 + h_8 S_2 + h_9 S_2 + \ldots$$

$$Y_4 = h_0 S_0 + h_1 S_1 + h_2 S_1 + h_3 S_1 + h_4 S_1 + h_5 S_2 + h_6 S_2 + h_7 S_2 + h_8 S_2 + h_9 S_3 + \ldots$$

$$Y_5 = h_0 S_1 + h_1 S_1 + h_2 S_1 + h_3 S_1 + h_4 S_2 + h_5 S_2 + h_6 S_2 + h_7 S_2 + h_8 S_3 + h_9 S_3 + \ldots$$

Hence, the above relationships and the increase in diversity introduced by oversampling are verified.

IV. Shortening the Impulse Response Length (IRL) of the Sub Channels

As described herein, the subchannels are processed by a set of shortening filters 218 to shorten the IRL of the subchannels. Shortening the IRL of the subchannels reduces the amount of data required at the over sampling stage described above, thereby reducing the computation requirements required to process the data. The invention is not limited to any particular approach for shortening the IRL of the subchannels and the approach employed may vary over time depending upon the requirements of a particular application. In some applications, the subchannels may not be filtered at all. Example procedures for determining impulse response shortening filters can be found in *Understanding Digital Subscriber Line Technology*, by Thomas Starr, John Cioffi and Peter Silverman, Prenice Hall, ISBN 0-13-780545-4.

Figure 5:
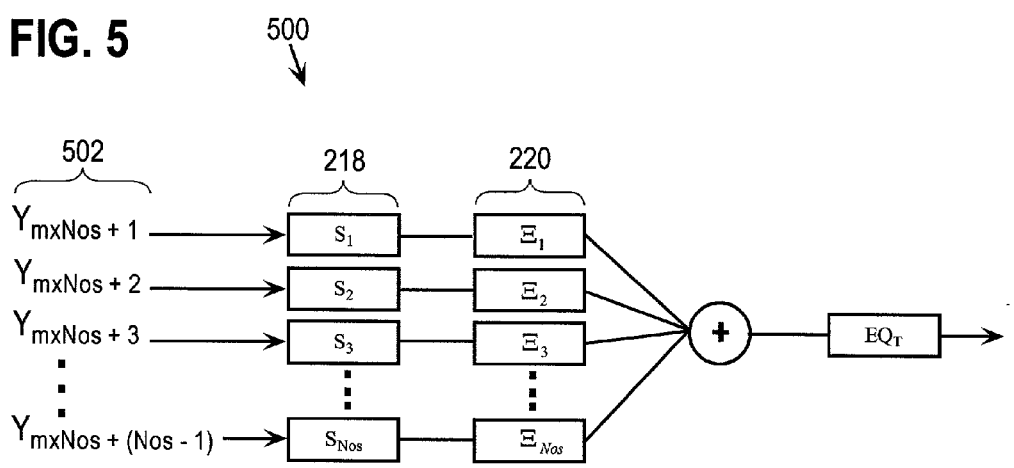
FIG. 5 is a block diagram that depicts the processing of the subchannels of information according to an embodiment of the invention.

FIG. 5 is a block diagram 500 that depicts the processing of the subchannels of information according to an embodiment of the invention. As depicted in block diagram 500, subchannels 502 are processed by the set of shortening filters 218, designated individually as $S_1$ through $S_{Nos}$, to shorten the IRL impulse response of the subchannels 502.

V. Determining and Applying Fir Filters to the Subchannels

According to one embodiment of the invention, the subchannel outputs from shortening filters 218 are processed by FIR filters 220, designated individually as $\Xi_1$ through $\Xi_{Nos}$, to remove crosstalk and other interference information from the subchannels. Although FIR filters 220 may be expressed mathematically in many equivalent forms, they are depicted in FIG. 5 as distinct blocks that operate separately on each of the subchannels of information. According to one embodiment of the invention, FIR filters 220 are determined based upon calculated noise covariance and signal covariance matrices.

A. Noise Covariance Computation

After the impulse response of each subchannel has been calculated, the noise covariance matrix as denoted by $N_C$ is calculated. At this time the transmitter is quiet and not transmitting information bearing signal. This allows for an accurate estimate of the noise statistics. This is performed as follows:

$$N_c = \frac{1}{K-1} \sum_{M=j}^{j+K} Y_M^T * Y_M$$

where $$Y_M = [Y_{M*N_{os}+1}, Y_{M*N_{os}+2}, \ldots, Y_{M*N_{os}+(N_{os}-1)}]$$

K is the number of samples used to calculate the noise covariance matrix. This number needs to be sufficiently large to ensure the quantity $N_C$ is statistically significant.

As an example of an implementation for ADSL systems the noise statistics may be initially calculated during C-QUIET5/R_ECT of the ADSL training sequence. See, e.g., ITU-T (TELECOMMUNICATION STANDARDIZATION SECTOR OF THE ITU) G.992.1 G.DMT Version 3 June 1999. This is because the transmitter at the central office is not transmitting any information-bearing signal but the CUSTOMER PREMISE MODEM (CPE) [device is recording data and transmits upstream. This facilitates and residual echo being captured in the noise covariance calculation.

B. Signal Covariance Computation

After the Noise Covariance Matrix Calculation is computed the signal covariance matrix is computed. According to one embodiment of the invention, this step is performed during a time where the transmitter is transmitting information-bearing signal. There are many procedures for calculating the signal covariance matrix and the invention is not limited to any particular approach. One example approach is as follows:

$$S_T = \left[ \frac{1}{K-1} \sum_{M=j}^{j+K} Y_M^T * Y_M \right]$$

$$S_C = S_T - N_C$$

where $$Y_M = [Y_{M*N_{os}+1}, Y_{M*N_{os}+2}, \ldots, Y_{M*N_{os}+L*(N_{os}-1)}]$$

and K is the number of samples used to calculate the noise covariance matrix. K is ideally selected to be sufficiently large to ensure the quantities $S_C$ and $S_T$ are statistically significant. L is the length of the longest impulse response of all the subchannels.

The method is essentially the same as that where the noise covariance is calculated except that the signal now contains information bearing signal and noise. Since the signal and the noise are assumed to be uncorrelated, the noise covariance $N_C$ can be subtracted from $S_T$ to determine $S_C$.

Following calculation of the signal and noise covariance matrices, crosstalk is removed from the information-bearing signal. According to one embodiment of the invention, this is achieved by calculating N finite impulse response (FIR) filters that will process the data from each subchannel. The output of these FIR filters is summed, with the effect of removing the cross talk yet maximizing the signal power. The Signal covariance matrix can also be calculated by the channel response if this is available during training.

C. Calculation of FIR Filters

Once the signal and noise covariance matrices have been calculated, the set of FIR filters 220 can be determined and applied. As depicted in FIG. 5 the set of FIR filters 220 is determined such that when their outputs are summed, the overall SNR of the system is maximized. The set of FIR 220 is given by:

$$\phi^1 = \{\phi_1^1, \ldots, \phi_L^1\}$$

$$\phi^2 = \{\phi_1^2, \ldots, \phi_L^2\}$$

$$\phi^3 = \{\phi_1^3, \ldots, \phi_L^3\}$$

$$\phi^4 = \{\phi_1^4, \ldots, \phi_L^4\}$$

$$\phi^{Nos} = \{\phi_1^{Nos}, \ldots, \phi_L^{Nos}\}$$

where:

$$\Theta = [\phi_1^1, \phi_1^2, \phi_1^3, \phi_1^4, \ldots, \phi_1^{Nos}, \ldots, \phi_L^1, \phi_L^2, \phi_L^3, \phi_L^4, \ldots, \phi_L^{Nos}]$$

and the SNR after the application of the above filters is given by $$SNR_{opt}(\Theta) = \inf_{\Theta} \frac{\Theta^T S_c \Theta}{\Theta^T N_c \Theta}$$

The solution to the above problem may be solved in many ways, depending upon the requirements of a particular application. An approach for determining a solution for $SNR_{opt}(\Theta)$ is as follows:

The solution to $$SNR_{opt}(\Theta) = \inf_{\Theta} \frac{\Theta^T S_c \Theta}{\Theta^T N_c \Theta}$$

can be expressed as the following generalized Eigen value problem:

$$S_C \Theta = \lambda N_C \Theta$$

where:

$\lambda$ is the corresponding Eigen value to the Eigen vector $\Theta$.

It has been determined that the $\Theta$ which maximizes the signal to noise ratio is the eigenvector $\Theta$ corresponding to the largest Eigen value. It can also be seen that the eigenvector $\Theta$ is the projection onto a subspace that maximizes the signal power while simultaneously minimizing the noise power. A method is described hereinafter that converts the generalized Eigen value problem to the solution of a symmetric Eigen value problem as follows:

Let $$N_C = C^T \cdot C$$

where:

C is the Cholesky decomposition of the $N_C$.

$$S_c \Theta = \lambda N_c \Theta$$

$$= \lambda C^T C \Theta$$

$$(C^T)^{-1} S_C (C)^{-1} C \Theta = \lambda C \Theta$$

The next step involves the definition of $$X = C\Theta$$

and the determination of the eigenvectors $X_{max}$ corresponding to the largest Eigen value $\lambda_{max}$ of the equation below:

$$(C^T)^{-1} S_C (C)^{-1} X = \lambda X$$

Hence $$\Theta = (C)^{-1} X_{max}$$

Following determination of the quantity $\Theta$, the filters $\{\phi^1, \phi^2, \ldots, \phi^n\}$ are then determined and used as the set of HR filters 220. Iterative and gradient based approaches to solving this problem may also be employed to solve the SNR maximization problem.

VI. Combining the Filtered Sub Channels

As depicted in FIG. 5, the outputs of FIR filters 220 are summed and presented to the next stage for processing. In the present example, the next stage of processing is performed by equalizer 222.

VII. Equalizing the Combined Signal to Further Shorten the Impulse Response of the Communications Channel The equalization performed equalizer 222 is optional and the type of equalization performed depends upon the requirements of a particular application, e.g., the type of modulation scheme used. For non-multicarrier applications, for example, a Quadrature Amplitude Modulation (QAM) system, an equalizer may be utilized to equalize the communications channel. In this situation, equalizer 222 compensates for the amplitude and phase distortions of the communications channel and previous processing of the system. Example families of equalizers that may be used to perform this include traversal equalizers, decision feedback equalizers or equalizers that perform the equalization on a MMSE sense. The invention is not limited to any particular type of equalization and any of the foregoing equalizers or other equalizers may be used for this function.

For multicarrier applications, for example, those that use Discrete Multitone Modulation or Orthogonal Frequency division multiplexing, an equalizer that further shortens the impulse response of the communications channel may be applied. In this situation, equalizer 222 further shortens the impulse response of the communications channel so that the impulse response fits within a guard band or cyclic prefix or suffix as dictated by the appropriate standard.

VIII. Implementation Mechanisms

The approach described herein for processing data received from a communications channel to remove crosstalk and other interference may be implemented in a variety of contexts and systems and the invention is not limited to any particular context or system. Signal separator 216, shortening filters 218 and FIR filters 220 are depicted and described as separate elements for purpose of explanation only. The functionality performed by signal separator 216, shortening filters 218 and FIR filters 220 may be separated or combined in any manner or arrangement and the invention is not limited to any particular arrangement. As but one example, the functionality of signal separator 216 may be incorporated into analog-to-digital converter 214. Furthermore, signal separator 216, shortening filters 218 and FIR filters 220 may be implemented as part of a communications system receiver, as depicted in FIG. 2, or may be implemented by one or more separate mechanisms that interact with a communications arrangement or receiver 206, and the invention is not limited to any particular implementation. Embodiments of the invention may be implemented in hardware, software, or any combination of hardware and software and the invention is not limited to any particular combination.

Figure 6:
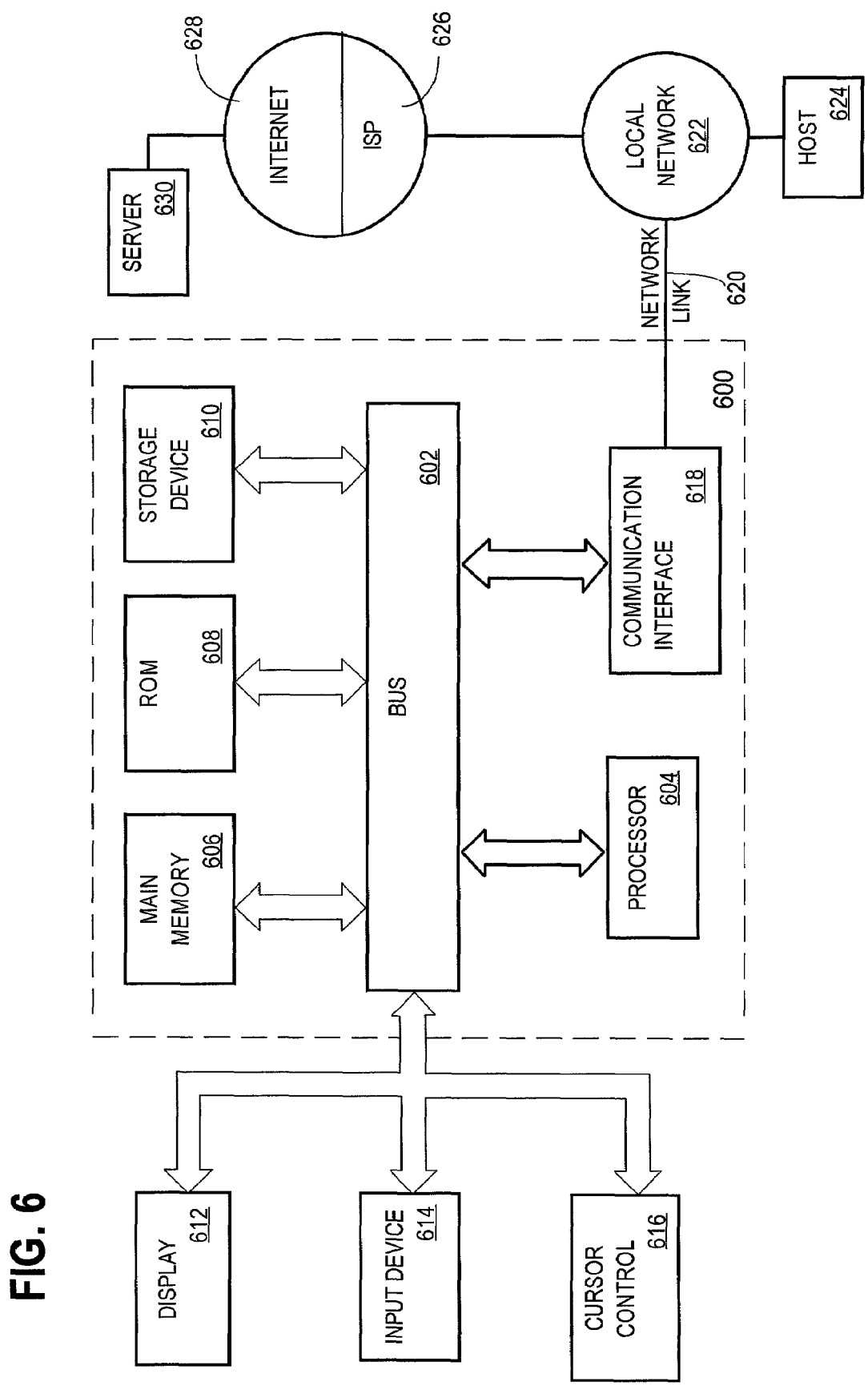
FIG. 6 is a block diagram that depicts an example computer system on which embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for processing data received from a communications channel. According to one embodiment of the invention, the processing data received from a communications channel is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multiprocessing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media and volatile media. Non-volatile media includes, for example, optical or magnetic disks, such as storage device 610. Volatile media includes dynamic memory, such as main memory 606.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for the processing data received from a communications channel as described herein.

The received code may be executed by processor 604 as it is received, and/or stored in storage device 610, or other non-volatile storage for later execution.

In the foregoing specification, particular embodiments have been described. It will, however, be evident that various modifications and changes may be made thereto without departing from the broader spirit and scope of the invention. The specification and drawings are, accordingly, to be regarded in an illustrative rather than a restrictive sense.

The invention claimed is:

1. A computer-readable medium carrying one or more sequences of one or more instructions for processing data received from a communications channel, the one or more sequences of one or more instructions including instructions which, when executed by one or more processors, cause the one or more processors to perform the steps of:
    sampling the received data at a specified sampling rate to generate sampled data;
    separating the sampled data into two or more subchannels of information;
    filtering the two or more subchannels of information to shorten the impulse response length of the two or more subchannels of information;
    after filtering the two or more subchannels of information to shorten the impulse response length of the two or more subchannels of information, filtering the two or more subchannels of information using one or more finite impulse response filters to remove crosstalk and other interference; and
    after filtering the two or more subchannels of information using one or more finite impulse response filters to remove crosstalk and other interference, combining the two or more subchannels of information to generate combined data.

2. The computer-readable medium as recited in claim 1, wherein the specified sampling rate varies over time.

3. The computer-readable medium as recited in claim 1, wherein the specified sampling rate is N times a minimum sampling rate.

4. The computer-readable medium as recited in claim 3, wherein the step of separating the sampled data into two or more subchannels of information includes separating the sampled data into N subchannels of information.

5. The computer-readable medium as recited in claim 1, wherein the one or more finite impulse response filters are determined by determining an impulse response of each of the two or more subchannels of information.

6. The computer-readable medium as recited in claim 5, further comprising determining a noise covariance matrix and a signal covariance matrix for the two or more subchannels of information.

7. The computer-readable medium as recited in claim 1, wherein the one or more finite impulse response filters are determined by solving a generalized Eigen value problem.

8. The computer-readable medium as recited in claim 7, wherein the one or more finite impulse response filters are determined by converting the generalized Eigen value problem to a computationally stable symmetric Eigen value problem.

9. The computer-readable medium as recited in claim 1, further comprising equalizing the combined data to shorten the impulse response of the communications channel.

10. The computer-readable medium as recited in claim 1, further comprising equalizing the combined data to equalize the communications channel.

11. The computer-readable medium as recited in claim 1, wherein the communications channel includes one or more twisted pair telephone lines.

12. The computer-readable medium as recited in claim 1, wherein the communications channel is a wireless communications channel.

13. The computer-readable medium as recited in claim 1, wherein the communications channel is part of a single carrier system.

14. An apparatus for processing data received from a communications channel, the apparatus comprising:
- a sampling mechanism configured to sample the received data at a specified sampling rate to generate sampled data;
- a separator configured to separate the sampled data into two or more subchannels of information;
- one or more shortening filters configured to filter the two or more subchannels of information to shorten the impulse response length of the two or more subchannels of information;
- one or more finite impulse response filters configured to after the filtering of the two or more subchannels of information by the one or more shortening filters to shorten the impulse response length of the two or more subchannels of information, filter the two or more subchannels of information to remove crosstalk and other interference; and
- a combiner configured to after the filtering of the two or more subchannels of information by the one or more finite impulse response filters to remove crosstalk and other interference, combine the two or more subchannels of information to generate combined data.

15. The apparatus as recited in claim 14, wherein the specified sampling rate varies over time.

16. The apparatus as recited in claim 14, wherein the specified sampling rate is N times a minimum sampling rate, wherein N is an integer.

17. The apparatus as recited in claim 16, wherein the separator is further configured to separate the sampled data into N subchannels of information, wherein N is an integer.

18. The apparatus as recited in claim 14, wherein the one or more finite impulse response filters are determined by determining an impulse response of each of the two or more subchannels of information.

19. The apparatus as recited in claim 18, wherein the one or more finite impulse response filters are determined by determining a noise covariance matrix and a signal covariance matrix for the two or more subchannels of information.

20. The apparatus as recited in claim 14, wherein the one or more finite impulse response filters are determined by solving a generalized Eigen value problem.

21. The apparatus as recited in claim 20, wherein the one or more finite impulse response filters are determined by converting the generalized Eigen value problem to a computationally stable symmetric Eigen value problem.

22. The apparatus as recited in claim 14, further comprising an equalizer configured to equalize the combined data to shorten the impulse response of the communications channel.

23. The apparatus as recited in claim 14, further comprising an equalizer configured to equalize the combined data to equalize the communications channel.

24. The apparatus as recited in claim 14, wherein the communications channel includes one or more twisted pair telephone lines.

25. The apparatus as recited in claim 14, wherein the communications channel is a wireless communications channel.

26. The apparatus as recited in claim 14, wherein the communications channel is part of a single carrier system.

* * * * *